United States Patent [19]

Sharp et al.

[11] Patent Number: 5,073,705
[45] Date of Patent: Dec. 17, 1991

[54] BROADBAND, MULTI-LINE, OPTICAL POWER LIMITING SCHEME

[75] Inventors: Edward J. Sharp, Stafford Co.; Mary J. Miller, Springfield; William W. Clark, III; Gary L. Wood, both of Fairfax, all of Va.; Gregory J. Salamo, Fayetteville, Ark.

[73] Assignee: The United States of America as represented by the Secretary of the Army, Washington, D.C.

[21] Appl. No.: 505,615

[22] Filed: Apr. 6, 1990

[51] Int. Cl.⁵ .................................................. H01J 3/14
[52] U.S. Cl. .................................... 250/216; 350/354
[58] Field of Search ............................ 250/216, 201.9; 350/354

[56] References Cited

U.S. PATENT DOCUMENTS 4,772,785  9/1988  Cheng et al. ................... 250/216
4,877,297  10/1989  Yeh ................................ 350/354

Primary Examiner—David C. Nelms
Assistant Examiner—Khaled Shami
Attorney, Agent, or Firm—Milton W. Lee; Anthony T. Lane

[57] ABSTRACT

This is a new use for known photorefractive crystals. If input radiation containing both non-coherent and multiple-line coherent radiation is directed into such a crystal from a predetermined range of directions with respect to the C axis of the crystal, rainbow scattering of the coherent radiation occurs, whereas normal scattering of the non-coherent radiation occurs. A detector toward which input radiation is directed through the crystal is thus protected from high-power, multiple-line coherent radiation such as that provided by a threat laser.

1 Claim, 2 Drawing Sheets

BROADBAND, MULTI-LINE, OPTICAL POWER LIMITING SCHEME

The invention described herein may be manufactured, used, and licensed by the U.S. Government for governmental purposes without the payment of any royalties thereon.

BACKGROUND OF INVENTION

This invention is in the field of optical detector or sensor (including eyes) protection. It is well known that optical sensors can be damaged by exposure to intense laser radiation of both pulsed and cw varieties. Protectors or optical limiters may be of two general types, active or passive. Active optical limiters require a pre-determination of the presence of threat radiation and then must provide an external stimulus (such as an applied electric field) to operate the limiter. Active devices are usually complex (tunable filters, for example) and are unable to rapidly respond to short pulses or bursts of harmful radiation. Passive protectors are preferred since the threat radiation itself triggers the desired protective response. An ideal protector must fulfill various requirements: it must not degrade or attenuate desired radiation (low insertion loss), it must provide complete blocking of radiation above some pre-determined threshold (i.e., a level considered harmful to the sensor or eyes), it must be sensitive over a sufficiently wide wavelength range to block all undesired radiation, it must have a wide field-of-view, it must be fast acting (for pulsed lasers), it must be capable of simultaneously blocking a multiplicity of intense laser wavelengths emanating from a single source, and it must be capable of responding to pulsed and cw lasers. Of late, there has been considerable interest in protecting sensors and eyes from high-power multi-line pulsed laser systems which are currently under development. The basic design of such lasers include a neodymium-doped laser host material such as glass or yttrium aluminum garnet (YAG). The fundamental output wavelength of such lasers is at 1.05 to 1.06 micrometers depending on the particular laser host material. This fundamental wavelength is frequency doubled (wavelength is halved) to approximately 0.53 micrometers. The beam at this wavelength can be used to pump a Raman cell which in turn emits several additional laser frequencies. These laser system (known as "rainbow" or "white light" lasers) are designed to deliver all of these laser lines simultaneously. That is, four or five laser lines at different wavelengths (each separated by several hundred angstroms in the visible spectrum) will simultaneously arrive at a targeted sensor. A representative group of wavelengths will include the fundamental at 1.06 micrometers, the doubled frequency at 0.53 micrometers and perhaps two or three Raman lines at 0.49 micrometers (anti-Stokes), and at 0.57 and 0.61 micrometers (Stokes). Here the wavelengths given for the Raman lines are only to illustrate their approximate spectral positions relative to the doubled frequency at 0.53 micrometers. The actual values of the Raman lines will depend on the Raman material selected for use in the laser system. In addition, the multiplicity of laser wavelengths (each with a substantial intensity) are capable of being delivered to the system in short pulsed (10 nanoseconds) at a repetition rate of 10 Hz or at a number of random delivery rates. Other serious threats in the visible spectral range are the argon-ion and krypton-ion lasers. They are continuous wave sources that emit at seven or eight frequencies simultaneously. When used in this fashion they can be regarded as cw "rainbow" or "white" lasers. A typical argon-ion laser can provide eight laser lines in the blue-green region of the visible spectrum with wavelengths between 0.457 micrometers and 0.514 micrometers. A krypton-ion laser can provide ten laser lines in the visible spectrum between 0.457 micrometers and 0.687 micrometers. Both pulsed and cw threats pose a serious problem for existing sensor protection technology. Fixed line filters are not viable solutions since the exact wavelengths of the Raman shifted 0.53 micrometers pump laser are uncertain and could even be changed during operation of the laser. Another drawback of fixed line filters designed to work simultaneously for so many laser lines is the large insertion loss. This particular problem applies even to state-of-the-art "rugate filters". That is, if more than three rejection wavelengths are designed into the filter the overall transmission of the filter is seriously degraded resulting in impairment of the sensor mission. Tunable filters are not capable of countering such a threat for two reasons; they cannot respond to nanosecond pulses and they cannot filter a multiplicity of laser lines simultaneously. The present invention overcomes these problems and provides passive broadband sensor protection against high intensity, short-pulse, high repetition rate multi-line lasers and multi-line cw-lasers. The teachings of the invention can be used to passively protect night-vision devices, sensitive photodetectors and eyes.

SUMMARY OF THE INVENTION

The invention is a new use for an old device. The old device is a photorefractive crystal, used as a beam fanning device for high intensity, single-wavelength coherent radiation. Its new use is as a protector of a sensitive photodetector from high-intensity, multiple-wavelength coherent radiation present in a spectrum of input radiation to the photodetector. The input radiation is directed through the crystal to the photodetector; non-coherent radiation passes through the crystal essentially uneffected, but high-intensity, multiple-wavelength coherent radiation, such as that produced by a laser, is rainbow scattered by the crystal and is thus diverted away from the photodetector.

DESCRIPTION OF PREFERRED EMBODIMENT

Figure 1:
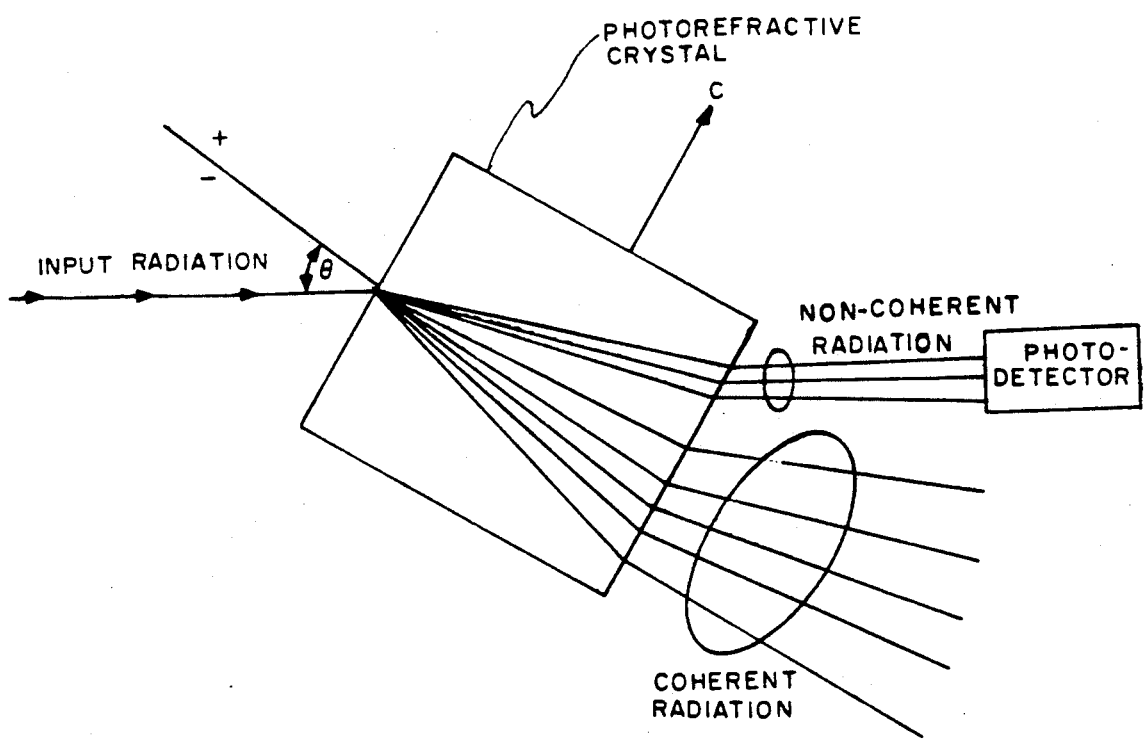
FIG. 1 is a schematic showing of a system made to take advantage of the inventive new use.

This invention takes advantage of the ability of certain photorefractive media to record spatially-shifted real time holograms with high diffraction efficiencies. These optical quality photorefractive materials are known to exhibit large optical nonlinearities. It is important to note that the photorefractive effect depends on the second-order nonlinear susceptibility (electro-optic) and is limited to materials which are acentric (those which lack an inversion center). Only fringe-making light (light capable of interference or coherent light) can give rise to the beam-fanning effect. We have recently discovered that photorefractive crystals can be arranged so that many coherent beams which are mutually incoherent (i.e., beams of significantly different wavelengths) will be photorefractively "fanned" to one side of the incident beam direction even when they are introduced into the crystal simultaneously. These new observations allow the present invention to protect sensors against multi-line, cw and pulsed, directed-energy threats such as those described earlier.

A band transport model is normally used to describe the index grating formation in photorefractive materials (crystals). The physical basis of the photorefractive mechanism may be understood from the following explanation. Under the influence of nonuniform or spatially periodic illumination, electrons or holes are optically excited from defect sites or impurity centers, leaving behind ionized donor sites. The photo-excited charges migrate to dark regions of the crystal by drift or diffusion before they recombine and form a static charge distribution. This charge distribution is, in phase with the incident irradiance and is balanced by a strong space-charge field according to Poisson's equation. This strong electric field then spatially alters or modulates the index of refraction through the electro-optic effect, that is, forms an "index grating" which is out of phase with the description of this dynamic process. From the description of this dynamic process it can be seen that such things as; the magnitude and sign of the electro-optic coefficients, the number density of charge carriers, the crystal symmetry, the mobilities of the charge carriers, and the recombination rates are all important material parameters in the photorefractive process. The particular photorefractive process of asymmetric self-defocusing or "beam fanning" which results from two-wave mixing or beam coupling will be exploited in the sensor protection device described here. The present invention seeks to exploit the coherent beam amplification and deamplification process associated with beam fanning of an enhanced nature which arises from the photorefractive nonlinearity and the simultaneous input of two or more mutually incoherent laser beams.

When a quasi-monochromatic coherent beam is introduced into a photorefractive crystal such as barium titanate ($BaTiO_3$), or crystals having the tungsten bronze structure such as; strontium barium niobate ($Sr_xBa_{1-x}Nb_2O_6$) SBN, or barium strontium potassium sodium niobate ($Ba_{2-x}Sr_xK_{1-y}Na_yNb_5O_{15}$) BSKNN, for example, much of the radiation can be deflected out to one side because of asymmetrical self-defocusing of the beam. This phenomenon is called "beam fanning" and forms the basis of the present invention. In these materials, the photorefractive nonlinearities are so strong that a coherent beam passing through the medium is deamplified and loses most of its incident power. Briefly, the process of scattering of radiation at large angles relative to the incident beam allows the coherent beams to "write" index gratings in the media. Beam coupling occurs between the incident beam and the scattered beams allowing an exchange of energy from one to the other. This leads to a depletion or deamplification of the incident beam in the direction of propagation or, alternately, an amplification of the scattered radiation. This amplified scattered radiation forms a broad fan of light to one side of the incident beam. The direction of energy coupling and thus the fanning direction is determined by the direction of the optic axis of the crystal.

We have recently discovered that photorefractive crystals can be arranged so that many coherent beams which are mutually incoherent (i.e., beams of significantly different wavelengths) will be photorefractively "fanned" to one side of the incident beam direction even when they are introduced into the crystal simultaneously. This beam fanning is substantially different in appearance and effect (i.e., the physical mechanism) from that obtained from a single wavelength source and is best described as "rainbow fanning".

When light from a coherent source, such as an argon-ion laser, which is simultaneously oscillating at more than one discrete wavelength, is passed through the crystal, an intense multi-colored ring of light composed of all the argon-ion wavelengths emerges in the direction of, and in addition to, the normal beam fan. This new observation allows the present invention to protect sensors against multi-line, directed-energy threats such as those described earlier.

Turning now to the drawings, in FIG. 1 we see a photorefractive crystal into which input radiation is directed. The radiation is a spectrum containing both coherent and non-coherent radiation. The coherent radiation is from a multiple-line, high-power laser and is a threat to a sensitive photodetector. As can be seen, the input radiation enters the crystal at an angle $\theta$ with respect to a plane perpendicular to the optic C axis of the crystal (more on this later). Non-coherent radiation undergoes normal refraction in the crystal. Coherent radiation, however, experiences rainbow fanning, as described above, and is directed away from the sensitive detector.

Figure 2:
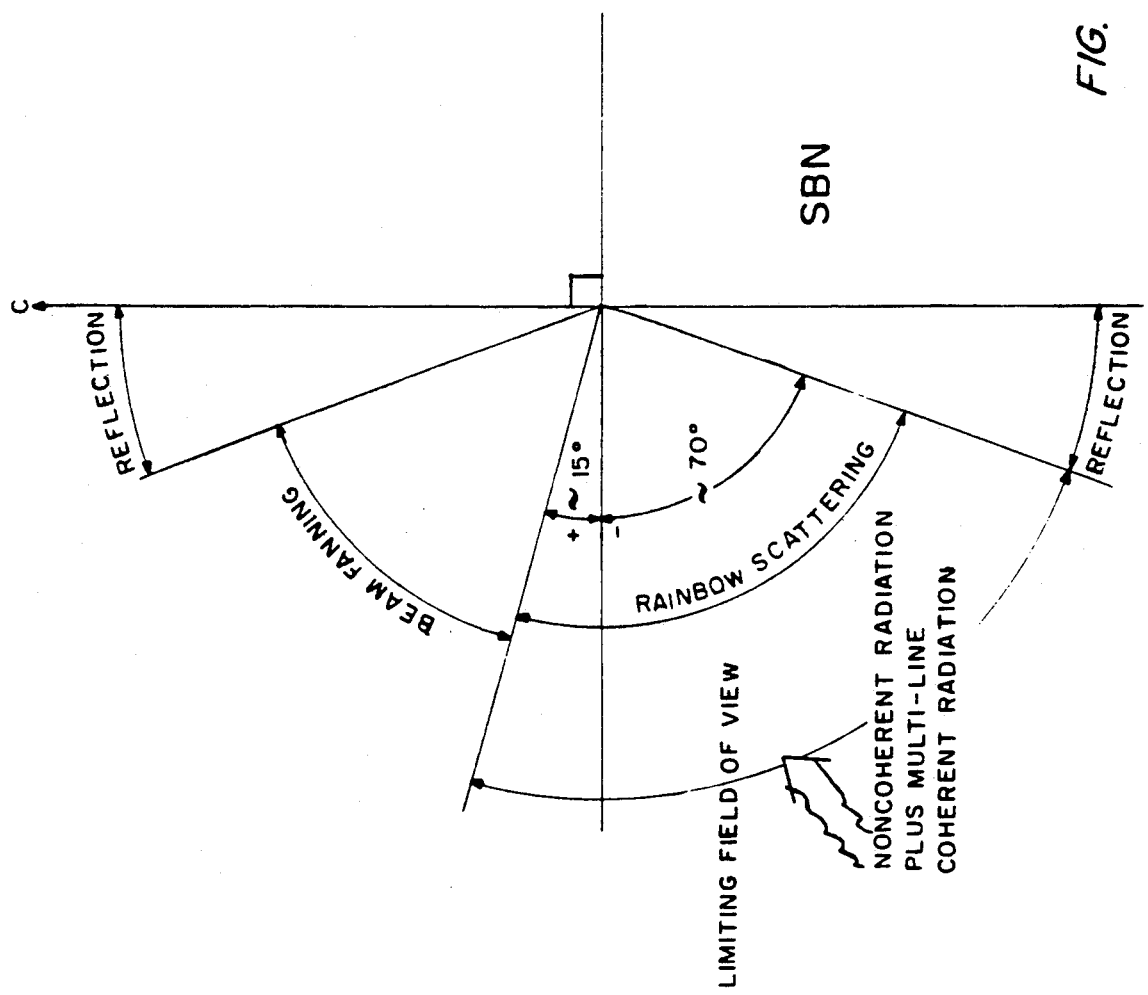
FIG. 2 is a diagram showing the response of a strontium barium niobate (SBN) crystal to incident electromagnetic radiation.

Referring now to FIG. 2, we can see the results from radiation striking a particular photorefractive crystal (SBN) surface. For best effect, the crystal is cut such that the surface of incidence (and exit) is parallel to the direction of the largest electro-optic coefficient (the C axis). For convenience, those angles of incident radiation on the drawing above the normal to C are designated as + and those below are designated −. For SBN, the limiting field-of-view (in which enhanced or rainbow scattering occurs) is in the approximate range of +15° to −70°. Outside this field-of-view, only normal beam fanning in the crystal will occur. Normal beam fanning works well as a limiter only for a single coherent incident laser wavelength. Therefore it is desirable to operator the invention in the angular range over which enhanced beam fanning occurs since this is the range that depletes multiwavelength incident coherent laser threats. The limiting field-of-view for a particular crystal is determined experimentally.

Although the incident radiation in FIG. 1 is shown as collimated, the rainbow scattering may be further enhanced by focussing input radiation into the crystal. Moreover, it may be desirable to disperse the input radiation prior to its introduction into the crystal. This dispersion may be accomplished with means such as prisms, optical coatings, or metallic meshes; such means allow flexibility in the choice of geometries for limiters embodying the invention.

We claim:

1. A method of protecting a sensitive photodetector from high-intensity, multiple-wavelength, coherent input radiation present in a non-coherent input radiation spectrum through the use of a photorefractive crystal, including the steps of:

cutting the photorefractive crystal such that the surfaces of incidence and exit are parallel to each other and to the direction of the largest electro-optic coefficient, normally referred to as the C axis of the crystal;

orienting said photorefractive crystal such that input radiation entering the crystal does so at an angle falling within a predetermined range as determined by the angular range of the specific crystal material selected over which enhanced beam fanning occurs for multi-wavelength coherent radiation, known as rainbow scattering, with said angle being measured between a plane perpendicular to the C axis of the crystal and the angle of incidence of the input radiation;

focusing said input radiation onto the face of said crystal whereby the angle of incidence of the input radiation within the predetermined angular rainbow scattering range of the crystal, where enhanced beam fanning occurs.

* * * * *